United States Patent
Li et al.

(10) Patent No.: US 10,678,717 B2
(45) Date of Patent: Jun. 9, 2020

(54) CHIPSET WITH NEAR-DATA PROCESSING ENGINE

(71) Applicant: Shanghai Zhaoxin Semiconductor Co., Ltd., Shanghai (CN)

(72) Inventors: Xiaoyang Li, Beijing (CN); Zongpu Qi, Beijing (CN); Zheng Wang, Beijing (CN); Di Hu, Beijing (CN); Yanliang Liu, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 151 days.

(21) Appl. No.: 15/797,490

(22) Filed: Oct. 30, 2017

(65) Prior Publication Data

US 2019/0004981 A1 Jan. 3, 2019

(30) Foreign Application Priority Data

Jun. 29, 2017 (CN) .......................... 2017 1 0516312

(51) Int. Cl.
| | | |
|---|---|---|
| *G06F 13/16* | (2006.01) | |
| *G06F 15/173* | (2006.01) | |
| *G06F 13/10* | (2006.01) | |
| *G06F 12/02* | (2006.01) | |
| *G06F 12/06* | (2006.01) | |
| *G06F 12/0831* | (2016.01) | |

(Continued)

(52) U.S. Cl.
CPC ...... *G06F 13/1673* (2013.01); *G06F 12/0246* (2013.01); *G06F 12/0638* (2013.01); *G06F 12/0831* (2013.01); *G06F 13/102* (2013.01); *G06F 13/4282* (2013.01); *G06F 15/17331* (2013.01); *G06F 2212/205* (2013.01); *G06F 2212/621* (2013.01)

(58) Field of Classification Search
CPC ... G06F 15/17331; G06F 13/102; G06F 12/10
See application file for complete search history.

(56) References Cited

U.S. PATENT DOCUMENTS

| 8,989,064 B2 | 3/2015 | Chang et al. |
|---|---|---|
| 2005/0172084 A1 | 8/2005 | Jeddeloh |

(Continued)

FOREIGN PATENT DOCUMENTS

| TW | 200602861 A | 1/2006 |
|---|---|---|
| TW | 201519581 A | 5/2015 |

OTHER PUBLICATIONS

Chinese language office action dated Dec. 29, 2017, issued in application No. TW 106129303.

*Primary Examiner* — Getente A Yimer
(74) *Attorney, Agent, or Firm* — McClure, Qualey & Rodack, LLP (57) ABSTRACT

A chipset with a near-data processing (NDP) engine, which uses the NDP engine to perform a command transformation and thereby to generate an input and output (I/O) command to operate a peripheral device connected to the chipset. The chipset further has a traffic control module. The chipset receives a request to operate the peripheral device, and the traffic control module directs the request to the NDP engine to be transformed into the I/O command. The NDP engine may implement a file system, or achieve acceleration of a database or may be operated to cope with a remote direct memory access packet.

20 Claims, 4 Drawing Sheets

(51) Int. Cl.
  *G06F 13/42*  (2006.01)
  *G06F 15/78*  (2006.01)

(56) References Cited

U.S. PATENT DOCUMENTS

| | | | |
|---|---|---|---|
| 2006/0026328 A1* | 2/2006 | Li | G06F 13/28 |
| | | | 710/306 |
| 2008/0263254 A1* | 10/2008 | Su | G06F 13/405 |
| | | | 710/310 |
| 2012/0198209 A1 | 8/2012 | Abdallah | |
| 2013/0151782 A1* | 6/2013 | Liu | G06F 12/0831 |
| | | | 711/130 |
| 2013/0159608 A1* | 6/2013 | Shin | G06F 3/0607 |
| | | | 711/103 |
| 2014/0164545 A1* | 6/2014 | Davis | G06F 13/28 |
| | | | 709/212 |
| 2015/0106682 A1 | 4/2015 | Grocutt et al. | |
| 2015/0121003 A1* | 4/2015 | Rosenband | G06F 3/061 |
| | | | 711/114 |
| 2015/0378814 A1* | 12/2015 | Webb | G06F 11/1068 |
| | | | 714/768 |
| 2017/0123995 A1* | 5/2017 | Freyensee | G06F 12/10 |
| 2017/0155717 A1 | 6/2017 | Tamir et al. | |
| 2018/0373454 A1 | 12/2018 | Xu et al. | |

\* cited by examiner

CHIPSET WITH NEAR-DATA PROCESSING ENGINE

CROSS REFERENCE TO RELATED APPLICATIONS

This Application claims priority of China Patent Application No. 201710516312.1, filed on Jun. 29, 2017, the entirety of which is incorporated by reference herein.

BACKGROUND OF THE INVENTION

Field of the Invention

The present invention relates to a high-functionality chipset.

Description of the Related Art

As data storage devices have developed, there have been a lot of demands placed on how a computer system can access such a data storage device. The traditional technique of reducing the workload of the computer system's central processing unit has been to perform most of the calculations required in accessing data at the storage device end. In the traditional techniques, calculation modules designed by the vendors themselves are provided in the data storage products. In order to be compatible with different data storage products, the input and output (I/O) communication of a computer system must be quite complex.

BRIEF SUMMARY OF THE INVENTION

A near-data processing (NDP) engine is provided on a chipset of a computer system to make data storage products simple and avoid problems with compatibility.

A chipset in accordance with an exemplary embodiment of the disclosure includes a near-data processing engine and a traffic control module. The traffic control module directs an operation request received by the chipset about a peripheral device connected to the chipset to the near-data processing engine for command transformation. The command transformation is performed by the near-data processing engine to generate an input and output command that is used in operating the peripheral device. The near-data processing engine includes a data buffer and a processor. The traffic control module uses the data buffer to buffer the operation request received by the chipset. The processor transforms the operation request to the input and output command and transmits the input and output command to the traffic control module, and the traffic control module directs the input and output command to the peripheral device.

The near-data processing engine may implement a file system or database acceleration, or cope with a remote direct memory access packet.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

Figure 1:
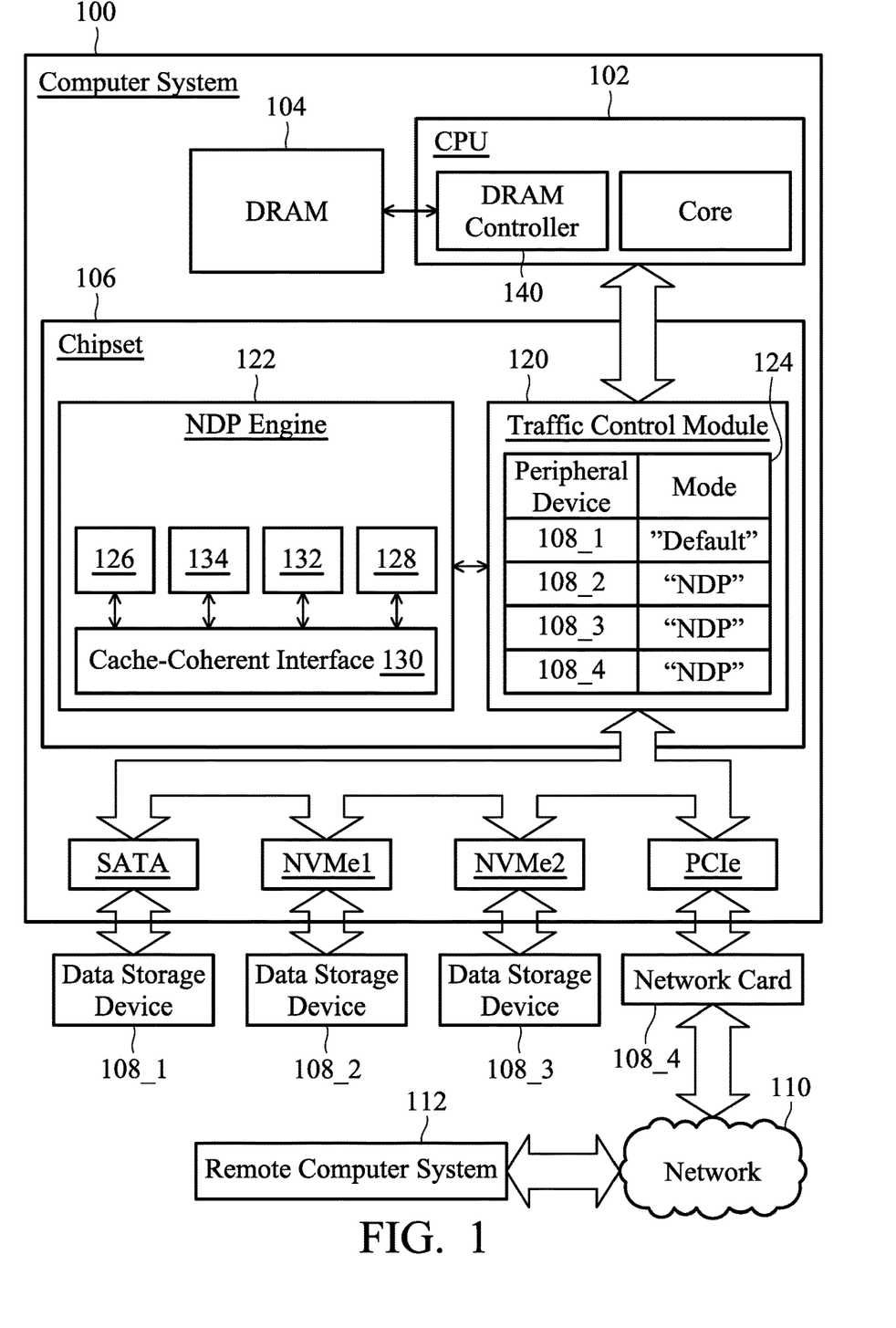
FIG. 1 is a block diagram depicting a computer system 100 in accordance with an exemplary embodiment of the disclosure.

FIG. 1 is a block diagram depicting a computer system 100 in accordance with an exemplary embodiment of the disclosure, which includes a central processing unit (CPU) 102, a dynamic random access memory (DRAM) 104, a chipset 106 and connection ports SATA, NVMe1, NVMe2 and PCIe. The computer system 100 may further include peripheral devices (including data storage devices 108_1 to 108_3 and a network card 108_4) connected to the connection ports.

The connection ports SATA, NVMe1, NVMe2 and PCIe are input and output (I/O) terminals of the computer system 100, and each follows a transmission interface like a serial advanced technology attachment (SATA) interface, a non-volatile memory express (NVMe) interface or a peripheral component interconnect express (PCIe) interface. In another exemplary embodiment, the connection port may adopt an Ethernet technology. The data storage devices 108_1, 108_2 and 108_3 are connected to the connection ports SATA, NVMe1 and NVMe2, respectively, as peripheral devices. The data storage devices 108_2 and 108_3 may be solid state disks (SSDs). The network card 108_4 is connected to the connection port PCIe as a peripheral device. The computer system 100 connects to a network 110 via the network card 108_4 to communicate with a remote computer system 112. It should be noted that the present invention does not limit the types of peripheral devices 108_1 to 108_4. In an exemplary embodiment, a peripheral device with a SATA interface or an NVMe interface may be connected to the connection port PCIe by an adapter card rather than a network card 108_4.

In particular, there are a traffic control module 120 and a near-data processing (NDP) engine 122 built into the chipset 106. In addition to the throughput control between the peripheral devices and the core and between the peripheral devices and the system memory (DRAM), the traffic control module 120 further controls the throughput regarding communications of the near-data processing engine 122. The traffic control module 120 recognizes whether or not to use the near-data processing engine 122. The near-data processing engine 122 is used to implement a file system, or for acceleration of a database, or for responding to a remote direct memory access (RDMA) packet transmitted from the remote computer system 112.

As shown in FIG. 1, the traffic control module 120 may manage a table 124 to specify whether or not the peripheral devices 108_1 . . . 108_4 connected to the connection ports SATA, NVMe1, NVMe2, and PCIe need the operations of the near-data processing engine 122. The table 124 may be managed through a driver of the computer system 100. The near-data processing engine 122 is not used for a peripheral device operated in a "default" mode. The near-data processing engine 122 is required for a peripheral device operated in an "NDP" mode. As shown in table 124, the SATA storage device 108_1 should be operated in the default mode and the NVMe storage devices 108_2 and 108_3 and the PCIe network card 108_4 should be operated in the NDP mode. The traffic control module 120 disposed between the central processing unit 102 and the connection ports (including SATA, NVMe1, NVMe2, PCIe) transmits the received signal based on the table 124.

During a downstream cycle, the central processing unit 102 transmits signals to operate a destination peripheral device connected to one of the I/O ports. The traffic control module 120 checks the table 124. When the destination peripheral device should be operated in the NDP mode, the traffic control module 120 directs the signals transmitted from the central processing unit 102 to the near-data processing engine 122. After being processed by the near-data processing engine 122, signals (or data) are returned to the traffic control module 120. When the traffic control module 120 determines that the source of the received signal is the near-data processing engine 122, the step of checking the table 124 is skipped and, according to the destination information originally contained in the received signal, the traffic control module 120 transmits the received signal to the destination peripheral device. In contrast, when the traffic control module 120 checks the table 124 and determines that the destination peripheral device should be operated in the default mode, the signals transmitted from the central processing unit 102 are directed to the destination peripheral device by the traffic control module 120 without being passed to the near-data processing engine 122 for additional operations.

During an upstream cycle, the traffic control module 120 receives signals from a source peripheral device connected to one of the I/O ports. The traffic control module 120 checks the table 124. When the source peripheral device should be operated in the NDP mode, the traffic control module 120 directs the signals transmitted from the source peripheral device to the near-data processing engine 122. After being processed by the near-data processing engine 122, signals (or data) are returned to the traffic control module 120. When the traffic control module 120 determines that the source of the received signal is the near-data processing engine 122, the step of checking the table 124 is skipped and, according to the destination information originally contained in the received signal, the traffic control module 120 transmits the received signal to the expected destination (the central processing unit 102 or another peripheral device). In contrast, when the traffic control module 120 checks the table 124 and determines that the source peripheral device should be operated in the default mode, the signals transmitted from the source peripheral device are directed to the central processing unit 102 or another peripheral device by the traffic control module 120 without being further processed by the near-data processing engine 122 for additional operations.

As shown in FIG. 1, the near-data processing engine 122 further includes a processor 126, a data buffer 128, a cache-coherent interface 130, a pattern matching module 132 and a data compressor 134. The functions of the different modules of the near-data processing engine 122 are described below with reference to the various embodiments.

Figure 2:
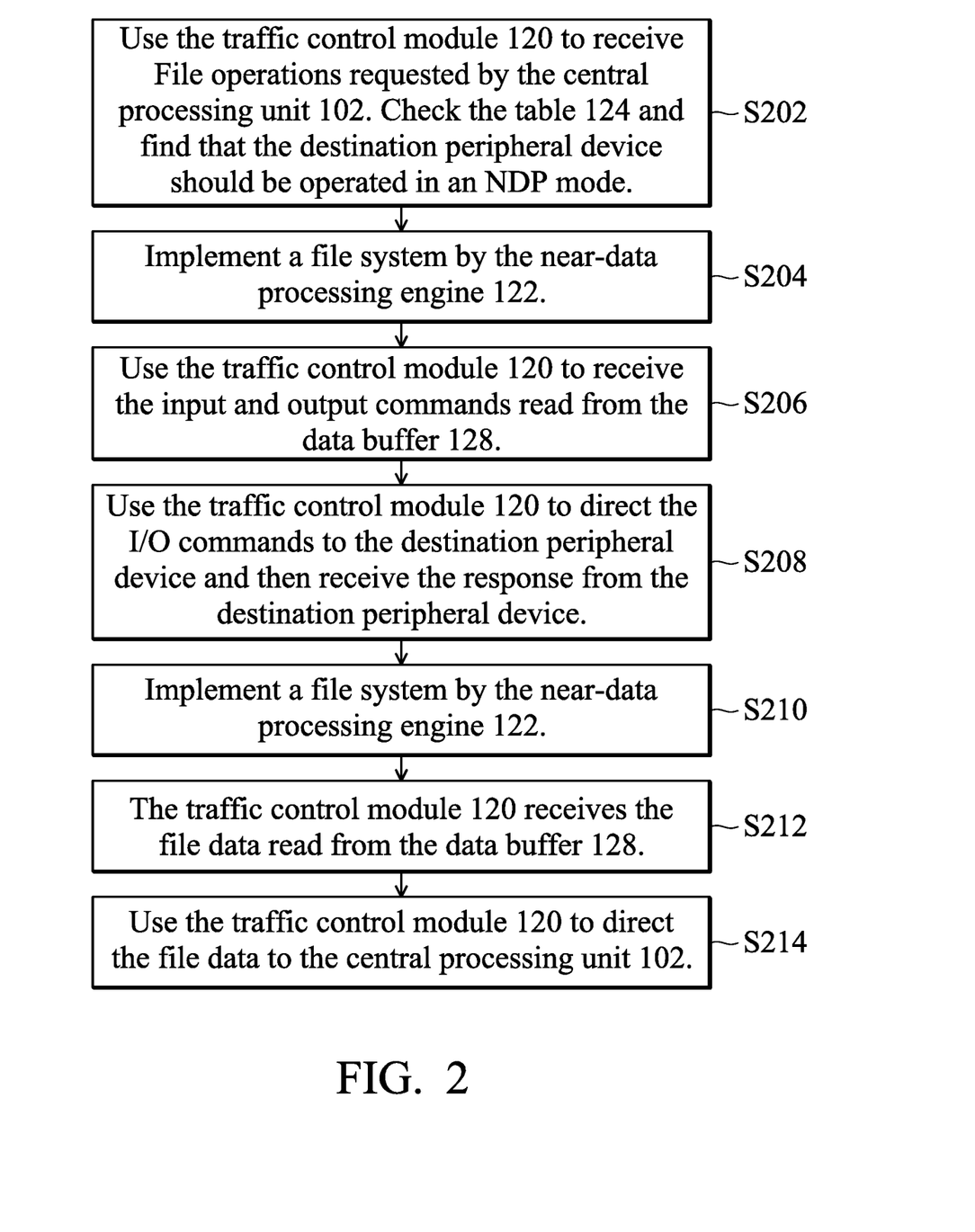
FIG. 2 is a flowchart depicting how the near-data processing engine 122 of FIG. 1 implements a file system in accordance with an exemplary embodiment of the disclosure.

FIG. 2 is a flowchart depicting how the near-data processing engine 122 of FIG. 1 implements a file system in accordance with an exemplary embodiment of the disclosure. The computer system 100 organizes the data stored in the storage devices 108_2 and 108_3 as files. File operations requested by the central processing unit 102 are received by the traffic control module 120 in step S202. The traffic control module 120 checks the table 124 and finds that the destination peripheral device should be operated in an NDP mode. In step S204, the near-data processing engine 122 implements a file system. In an exemplary embodiment, the traffic control module 120 temporarily stores the file operations received from the central processing unit 102 in the data buffer 128. The processor 126 retrieves the file operations from the data buffer 128 via the cache-coherent interface 130, and transforms the file operations to input and output (I/O) commands and stores the input and output commands to the data buffer 128. In step S206, the traffic control module 120 receives the input and output commands read from the data buffer 128. In step S208, the traffic control module 120 directs the input and output commands to the destination peripheral device and then receives the response (e.g. raw data) from the destination peripheral device. In step S210, the near-data processing engine 122 implements a file system again. In an exemplary embodiment, the traffic control module 120 stores the response from the destination peripheral device to the data buffer 128 to be retrieved by the processor 126 via the cache-coherent interface 130 to be transformed into file data and buffered in the data buffer 128. In step S212, the traffic control module 120 receives the file data read from the data buffer 128. In step 214, the traffic control module 120 directs the file data to the central processing unit 102. In an exemplary embodiment, the traffic control module 120 regards a dynamic random access memory (DRAM) controller 140 as the destination of the file data, to use the DRAM for temporary storage of the file data.

The file system implemented by the near-data processing engine 122 provided on the chipset 106 effectively reduces the computational burden of the central processing unit 102. The central processing unit 102 only needs to simply request file operations in units of files. The resource-consuming computations of a file system are not needed to be performed by the central processing unit 102.

In an exemplary embodiment, the central processing unit 102 operates to implement a virtual file system (VFS). In this example, the near-data processing engine 122 could implement any kind of file system entity. The virtual file system commands (VFS commands) are transformed by the near-data processing engine 122 into file system management commands, which are then transformed into block input and output commands (block I/O commands).

The VFS commands at the central processing unit 102 end may include lseek, read, write, mmap, open, ioctl . . . etc. The near-data processing engine 122 can be implemented by an Etx4fs technology for an embedded system in ARM architecture. The block I/O commands at the I/O end may include create, lookup, readpage, mknod . . . etc.

Figure 3:
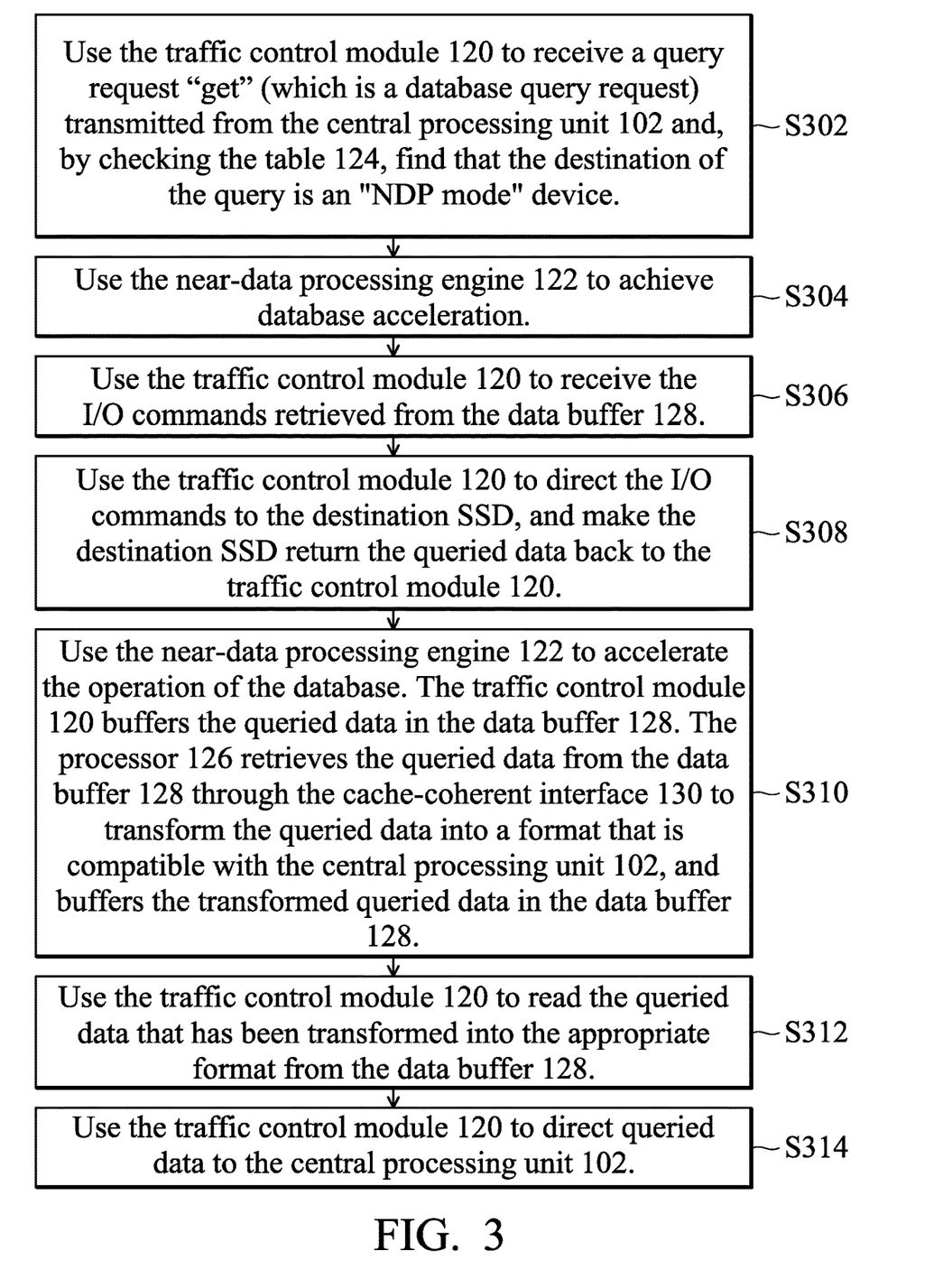
FIG. 3 is a flowchart depicting how the near-data processing engine 122 of FIG. 1 is used in acceleration of a database in accordance with an exemplary embodiment of the disclosure.

FIG. 3 is a flowchart depicting how the near-data processing engine 122 of FIG. 1 is used in acceleration of a database in accordance with an exemplary embodiment of the disclosure. For example, the computing system 100 may be used to establish a data center. The central processing unit 102 outputs database requests such as a request for space allocation "create namespace", a query request "get(namespace_id, key)", a request for storing data "put(namespace_ids, keys, values, lengths)", and so on. The transformation from database requests to input and output commands (I/O commands) are performed by the near-data processing engine 122. The operation of the database, therefore, is accelerated. In the following, a query request "get" is discussed as an example.

In step S302, the traffic control module 120 receives a query request "get" (which is a database query request) transmitted from the central processing unit 102. By checking the table 124, the traffic control module 120 finds that the destination of the query is an "NDP mode" device. In step S304, database acceleration is achieved by the near-data processing engine 122. In an exemplary embodiment, the traffic control module 120 temporarily stores the query request "get" in the data buffer 128. The processor 126 retrieves the query request "get" from the data buffer 128 through the cache-coherent interface 130 to recognize the destination SSD (solid state disk) and generate the corresponding input and output commands, and the processor 126 uses the data buffer 128 to buffer the input and output commands. In step S306, the traffic control module 120 receives the input and output commands retrieved from the data buffer 128. In step S308, the traffic control module 120 transmits the input and output commands to the destination SSD, and the destination SSD returns the queried data back to the traffic control module 120. In step S310, the near-data processing engine 122 accelerates the operation of the database again. In an exemplary embodiment, the traffic control module 120 temporarily stores the queried data in the data buffer 128. The processor 126 retrieves the queried data from the data buffer 128 through the cache-coherent interface 130 to transform the queried data into a format that is compatible with the central processing unit 102, and uses the data buffer 128 to buffer the queried data that has been transformed into a format that is compatible with the central processing unit 102. The queried data that has been transformed into the appropriate format is read from the data buffer 128 by the traffic control module 120 in step S312, and is directed to the central processing unit 102 by the traffic control module 120 in step S314. In an exemplary embodiment, the traffic control module 120 regards a dynamic random access memory (DRAM) controller 140 as the destination of the queried data, to use the DRAM for temporary storage of the queried data.

The database acceleration achieved by the near-data-side processing engine 122 within the chipset 106 effectively reduces the computational burden of the central processing unit 102 and does not require significant changes on data storage devices. The chipset 106 has high compatibility.

Figure 4:
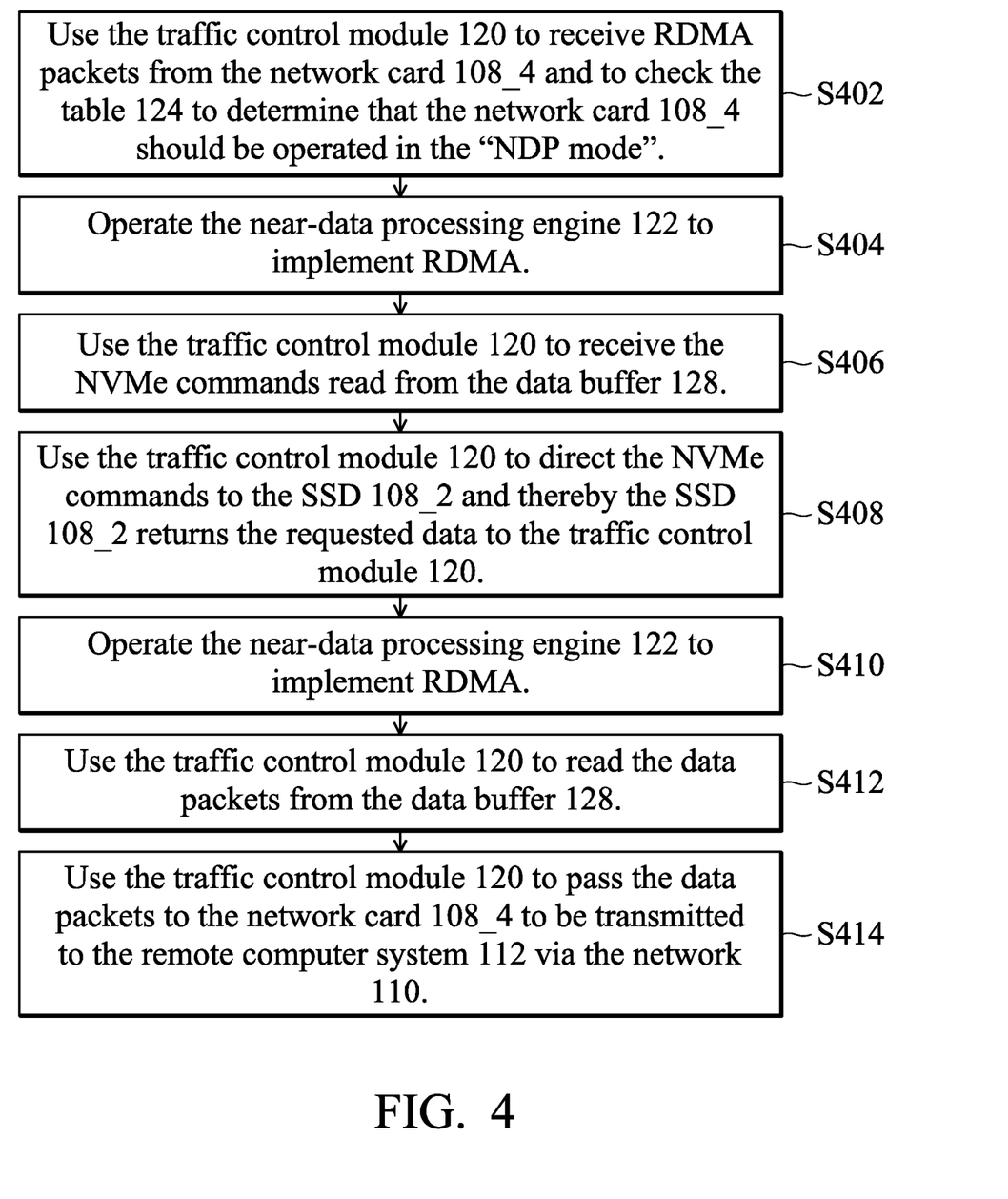
FIG. 4 is a flowchart depicting how the near-data processing engine 122 of FIG. 1 copes with RDMA (abbreviated from Remote Direct Memory Access) packets transmitted from the remote computer system 112 in accordance with an exemplary embodiment of the disclosure.

FIG. 4 is a flowchart depicting how the near-data processing engine 122 of FIG. 1 copes with RDMA (abbreviated from Remote Direct Memory Access) packets transmitted from the remote computer system 112 in accordance with an exemplary embodiment of the disclosure. The computer system 100 receives the RDMA packets from the network 110 via the network card 108_4 that is operating in the "NDP mode". The target of the RDMA packets is the local memories of the computer system 100, such as the storage device 108_2 or 108_3 (SSD) which is designed to be operated in the "NDP mode". Remote read operations are discussed below.

In step S402, the traffic control module 120 receives the RDMA packets from the network card 108_4, and checks the table 124 to determine that the network card 108_4 should be operated in the "NDP mode". In step S404, the near-data processing engine 122 operates to implement the remote direct memory access (RDMA). In an exemplary embodiment, the traffic control module 120 temporarily stores the RDMA packets in the data buffer 128. The content stored in the data buffer 128 is checked through the cache-coherent interface 130 by the pattern matching module 132 and a confirmation is made (by checking the Hash values contained in the RDMA packets) about whether there are any RDMA packets and whether the RDMA packets are requesting to read the local SSD 108_2 which is also operated in the "NDP mode". The processor 126 receives the RDMA packets from the data buffer 128 through the cache-coherent interface 130, transforms the RDMA packets into NVMe commands, and uses the data buffer 128 to buffer the NVMe commands. The NVMe commands are requested to operate the local SSD. In step S406, the traffic control module 120 receives the NVMe commands read from the data buffer 128. In step S408, the traffic control module 120 directs the NVMe commands to the SSD 108_2 and the SSD 108_2 returns the requested data to the traffic control module 120. Note that it is indicated in one field of the NVMe command that the destination of the NVMe command is the SSD 108_2 and, according to this field, the traffic control module 120 directs the NVMe commands to the SSD 108_2. In step S410, the near-data processing engine 122 operates to implement the remote direct memory access (RDMA) again. In an exemplary embodiment, the traffic control module 120 temporarily stores the data retrieved from the SSD 108_2 in the data buffer 128. The content stored in the data buffer 128 is read and packed by the processor 126 through the cache-coherent interface 130, and then stored back in the data buffer 128 as data packets. In step S412, the traffic control module 120 read the data packets from the data buffer 128. In step S414, the traffic control module 120 passes the data packets to the network card 108_4 and the data packets are transmitted to the remote computer system 112 via the network 110.

Remote direct memory access is implemented between the computer system 100 and the remote computer system 122 by the near-data processing engine 122 provided within the chipset 106. The central processing unit 102 does not intervene in the data exchange between the SSD 108_2 and the remote computer system 112.

It is noted that when it is confirmed by the pattern matching module 132 that the packets from the network card 108_4 are not RDMA packets, the traffic control module 120 directs the received packets to the central processing unit 102 to be processed by the central processing unit 102.

When the target of an RDMA packet received via the network card 108_4 is not the local storage device 108_2 or 108_3, the pattern matching module 132 generates a returned packet which contains a tag that clearly indicates the target of the received RDMA packet. The pattern matching module 132 uses the data buffer 128 to buffer the returned packet and then the processor 126 transmits the returned packet to the traffic control module 120 through the cache-coherent interface 130. The traffic control module 120 transmits the returned packet via the network card 108_4 to the correct target according to the tag contained in the returned packet. For example, when determining that the received RDMA packet is for accessing a peripheral device at a third end (not managed by the computer system 100 or the remote computer system 112), the pattern matching module 132 generates a returned packet that contains a tag indicating the third end. The pattern matching module 132 uses the data buffer 128 to buffer the returned packet and then the processor 126 transmits the returned packet to the traffic control module 120 through the cache-coherent interface 130. The traffic control module 120 transmits the returned packet via the network card 108_4 to the third end according to the third-end tag contained in the returned packet.

The data compressor 134 is an optional module in the near-data processing engine 122, which communicates with the processor 126 and the data buffer 128 via the cache-coherent interface 130. The data compressor 134 is operative to perform data compression for the target peripheral device or decompression of the commands or requests issued by the central processing unit 102. The near-data processing engine 122 may further include a module for data encryption and decryption (not shown in the figure), which communicates with the processor 126 and the data buffer 128 via the cache-coherent interface 130 and is operative to perform data encryption and decryption for the target peripheral device or data encryption and decryption of the commands or requests issued by the central processing unit 102.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A chipset of a host system, comprising:
a near-data processing engine; and
a traffic control module, directing an operation request received by the chipset about a peripheral device connected to the chipset to the near-data processing engine for command transformation,
wherein:
the command transformation is performed by the near-data processing engine to generate an input and output command that is used in operating the peripheral device and configured to reduce the workload at the peripheral device;
the near-data processing engine includes a data buffer and a processor;
the traffic control module uses the data buffer to buffer the operation request received by the chipset; and
the processor transforms the operation request to the input and output command and transmits the input and output command to the traffic control module, and the traffic control module directs the input and output command to the peripheral device.

2. The chipset as claimed in claim 1, wherein:
the near-data processing engine implements a file system;
the traffic control module uses the data buffer to buffer a file operation issued by a central processing unit; and
the processor transforms the file operation to the input and output command and transmits the input and output command to the traffic control module to be directed to the peripheral device by the traffic control module.

3. The chipset as claimed in claim 2, wherein:
after directing the input and output command to the peripheral device, the traffic control module uses the data buffer to buffer a response from the peripheral device to be transformed into file data by the processor, and the traffic control module directs the file data to the central processing unit.

4. The chipset as claimed in claim 2, wherein:
a virtual file system command is issued by the central processing unit to be received by the chipset; and
the traffic control module transmits the virtual file system command to the near-data processing engine to be transformed into a file system management command by the near-data processing engine and then be transformed into a block input and output command.

5. The chipset as claimed in claim 1, wherein:
the near-data processing engine implements database acceleration;
the traffic control module uses the data buffer to buffer a database request issued by a central processing unit; and
the processor transforms the database request to the input and output command and transmits the input and output command to the traffic control module to be directed to the peripheral device by the traffic control module.

6. The chipset as claimed in claim 5, wherein:
after directing the input and output command to the peripheral device, the traffic control module uses the data buffer to buffer a response from the peripheral device to be transformed into a format that is compatible with the central processing unit by the processor, and the traffic control module directs the transformed response to the central processing unit.

7. The chipset as claimed in claim 1, wherein:
the near-data processing engine further includes a pattern matching module and the near-data processing engine uses the pattern matching module to cope with a remote direct memory access packet transmitted from a remote computer system.

8. The chipset as claimed in claim 7, wherein:
the traffic control module uses the data buffer to buffer the remote direct memory access packet to be checked by the pattern matching module; and
when the pattern matching module determines that the remote direct memory access packet is for operating the peripheral device, the processor transforms the remote direct memory access packet to the input and output command and transmits the input and output command to the traffic control module to be directed to the peripheral device by the traffic control module.

9. The chipset as claimed in claim 8, wherein:
after directing the input and output command to the peripheral device, the traffic control module uses the data buffer to buffer a response from the peripheral device to be transformed into a data packet to be directed to the remote computer system by the traffic control module.

10. The chipset as claimed in claim 7, wherein:
the traffic control module uses the data buffer to buffer the remote direct memory access packet to be checked by the pattern matching module;
when determining that the remote direct memory access packet is for operating another peripheral device at a third end, the pattern matching module generates a returned packet that contains a tag indicating the third end and uses the data buffer to buffer the returned packet; and
the processor transmits the returned packet to the traffic control module to be directed to the third end by the traffic control module.

11. The chipset as claimed in claim 7, wherein:
the traffic control module uses the data buffer to buffer a remote packet transmitted from the remote computer system to be checked by the pattern matching module;

when determining that the remote packet is not the remote direct memory access packet, the pattern matching module directs the remote packet to a central processing unit.

12. The chipset as claimed in claim 1, wherein:
the near-data processing engine further provides a cache-coherent interface; and
the processor accesses the data buffer through the cache-coherent interface.

13. The chipset as claimed in claim 12, wherein:
the near-data processing engine further includes a data compressor operative to perform data compression for the peripheral device; and
the processor operates the data compressor via the cache-coherent interface.

14. The chipset as claimed in claim 12, wherein:
the near-data processing engine further includes an encryption and decryption module operative to perform data encryption and decryption for the peripheral device; and
the processor operates the encryption and decryption module via the cache-coherent interface.

15. The chipset as claimed in claim 1, wherein:
the traffic control module provides throughput control on data transmitted to the near-data processing engine; and
the traffic control module also provides throughput control between a default-mode peripheral device and a central processing unit, wherein communication between the default-mode peripheral device and the central processing unit does not pass through the near-data processing engine.

16. The chipset as claimed in claim 15, wherein:
the traffic control module includes a table, and an operation mode of the peripheral device is listed in the table;
the traffic control module checks the table when receiving the operation request;
when the traffic control module finds from the table that the peripheral device is operating in a near-data processing mode, the traffic control module directs the operation request to the near-data processing engine.

17. The chipset as claimed in claim 16, wherein:
the traffic control module also directs a response that the peripheral device made in response to the operation request to the near-data processing engine.

18. The chipset as claimed in claim 15, wherein:
the traffic control module includes a table indicating an operation mode of a network card that is connected to the chipset and provides the chipset with the operation request; and
when receiving the operation request, the traffic control module checks the table; and
when the traffic control module finds from the table that the network card is operating in a near-data processing mode, the traffic control module directs the operation request to the near-data processing engine.

19. The chipset as claimed in claim 18, wherein:
the traffic control module also directs a response that the peripheral device made in response to the operation request to the near-data processing engine.

20. The chipset as claimed in claim 1, wherein:
the peripheral device is a storage device with a Non-Volatile Memory express (NVMe) interface; and
the input and output command is a NVMe command.

* * * * *